May 24, 1955  M. W. BERG  2,709,052
SPANWISE FLOW CONTROL OF FLUID SWEPT LIFTING SURFACES
Filed April 15, 1952  3 Sheets-Sheet 1

INVENTOR
MAX. W. BERG

BY *[signature]*

ATTORNEYS

INVENTOR
MAX. W. BERG

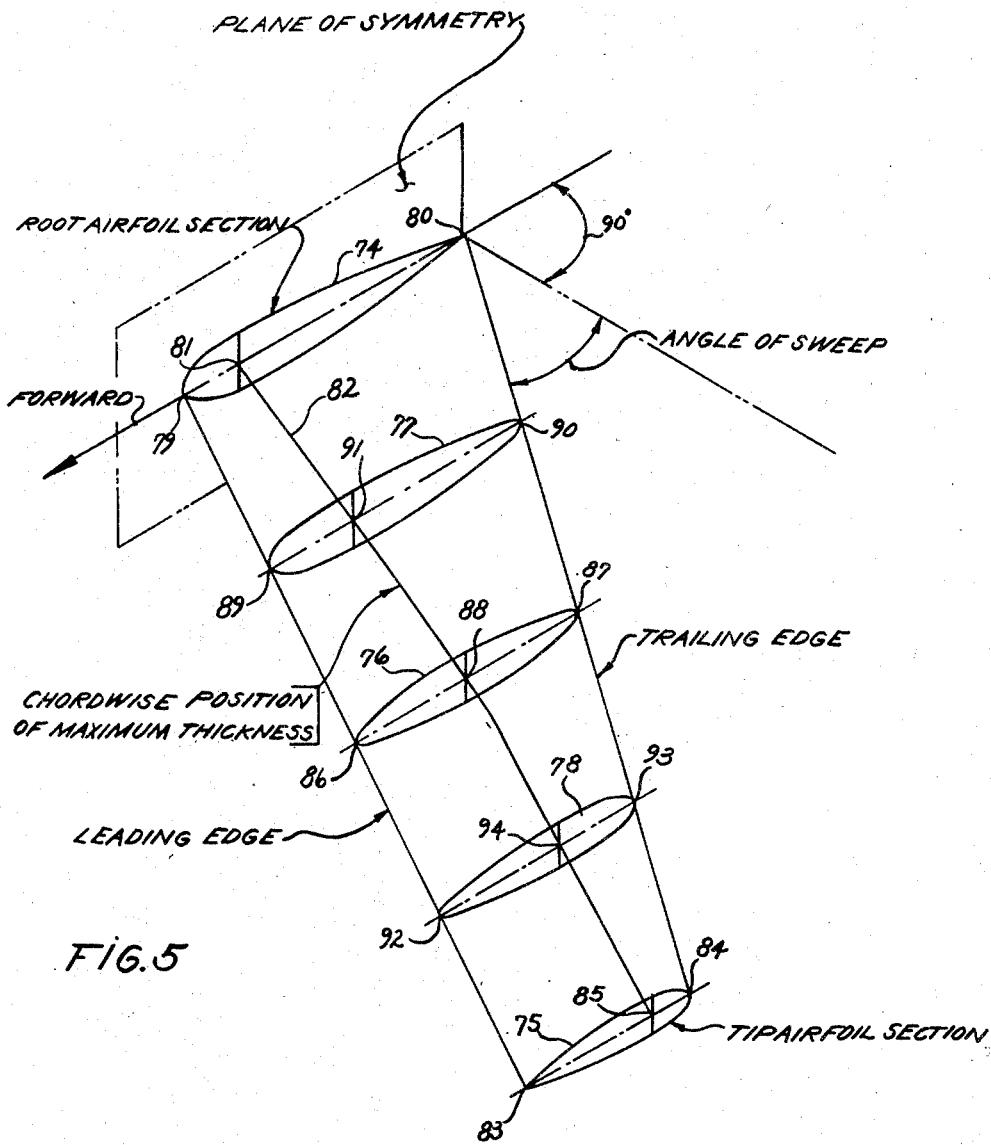

United States Patent Office 2,709,052
Patented May 24, 1955

2,709,052

SPANWISE FLOW CONTROL OF FLUID SWEPT LIFTING SURFACES

Max W. Berg, Drexel Hill, Pa., assignor of one-half to Charles J. Fletcher, Franklin, N. J.

Application April 15, 1952, Serial No. 282,338

2 Claims. (Cl. 244—35)

This invention relates to the design and construction of bodies such as airplane wings having fluid swept surfaces adapted to be driven through a fluid, and in particular through the air, where it is intended to produce a useful force component perpendicular to the relative velocity or direction of the flow of the fluid with respect to the surface, said useful force component being generally referred to as "lift" and the said surfaces to be referred to as "lifting surfaces" or "wings," and in particular the lifting surface or wing is referred to as one swept with relation to a vertical plane transverse to the longitudinal axis or plane of symmetry of the said body.

The purpose of this invention is the attainment of controlled spanwise flow of the air over the lifting surfaces or wings of an aircraft thereby resulting in, for the said surfaces, improved stalling characteristics, improved high speed air flow conditions about the wing tips thereby reducing the buffet region and divergent tendencies characteristic of today's swept wings wherein these effects are currently described as aeroelastic phenomena, improved structural and flutter characteristics, improved weight characteristics, improved downwash characteristics, and, for the aircraft incorporating the said surfaces, improved lateral, directional, and longitudinal stability and control characteristics.

Whereas various attempts have been made to control the spanwise flow of air over swept wings in order to improve the lifting force, improve stalling characteristics and to produce improved stability and control characteristics of the aircraft incorporating the said wings, the methods employed were directed principally toward altering camber, taper and twist between wing root and tip, the use of nose flaps, extended surfaces and flaps, auxiliary surfaces, air dams, and the like, whereas these changes did improve the performance to a small extent, the general shape and chordwise disposition of the wing maximum thickness line and the dimensions and edge radii of the leading and trailing edges of the said wings being virtually unchanged between wing root and tip from its original configuration, and whereas nearly the same general performance characteristics of the aircraft remained, this invention contemplates a new disposition chordwise of the swept wing maximum thickness line extending spanwise from root to tip and an altering of the said wing leading and trailing edge radii from root to tip in a manner providing for the control of air flow spanwise over the said wing, whereby virtue of such control greatly improved performance characteristics of swept wing aircraft will be evidenced.

With this thought in mind my invention contemplates an aircraft with lifting surfaces or wings swept with relation to a vertical plane transverse to the longitudinal axis of the said aircraft, for example a wing having swept back leading and trailing edges, whereby the said wing, being composed of numerous airfoil section profile shapes varying from wing root to tip as functions of wing planform taper, camber and thickness distributions, is constructed in accordance with my invention thusly: the root airfoil section being provided with a relatively sharp leading edge and blunt trailing edge and a position of maximum thickness closest to the trailing edge, say, for example, at 70 per cent of the chord; the tip airfoil section being provided with a relatively blunt leading edge and sharp trailing edge and a position of maximum thickness closest to the leading edge, say, for example, at 30 per cent of the chord; the mid-span airfoil section, centrally located spanwise between root and tip, being provided with leading and trailing edge radii of equal magnitude and a position of maximum thickness midway between the leading and trailing edges, say, at 50 per cent of the chord; and intermediate airfoil sections between root and mid-span, and mid-span and tip being provided with varying leading and trailing edge radii and chordwise positions of the wing maximum thickness; whereby the leading edge radii progressively increase spanwise fom the sharp leading edge at the root section to the blunt leading edge at the tip section, whereby the trailing edge radii progessively decrease spanwise from the blunt trailing edge at the root section to the sharp trailing edge at the tip section, whereby the chordwise positions of the wing maximum thickness move forward spanwise from root to tip, and whereby these variations in leading and trailing edge radii and chordwise positions of the maximum thickness are constructed in a progressive and proportionate manner such that smooth surface contours of the wing upper and lower surfaces are provided. The object of this arrangement of airfoil section profile structure from wing root to tip is the evocation of lift-producing vorticity at the wing root leading edge and propagation of this said vorticity along the leading edge spanwise from root to tip, and the retardation of the lift-reducing vorticity that occurs over the present day, subsistent swept wing trailing edges from root to tip.

This construction method of my invention, which I claim will control the spanwise flow of air over swept lifting surfaces or wings, applies not only to swept back wings but to swept forward lifting surfaces or wings, to plan form variations in sweep such as delta wings, and to any lifting surfaces which, by their relative motion through a fluid such as air, induce the phenomena of spanwise flow. The basic application of my invention is to construct variations in leading and trailing edge radii and chordwise positions of the maximum thickness spanwise along the surface or wing from root to tip such that proper control of the lift vortices is provided. It will be shown subsequently in this discussion that this instant inventive construction method is consistent and unaltered in philosophy when applied to swept forward wings although the actual physical construction of the leading and trailing edge radii and chordwise positions of the maximum thickness from root to tip are exactly the reverse of that required for the swept back wing. I believe the subsequent discussion on the physical phenomena associated with the propagation of lift vortices and their connection with spanwise air flow will clarify the intent of my invetnion.

Other features and advantages of the invention will appear from the following description taken in connection with the drawings, wherein the drawings are concerned, primarily, with illustrating the theory and methods of application of the structure embodying this instant invention:

Figure 4:
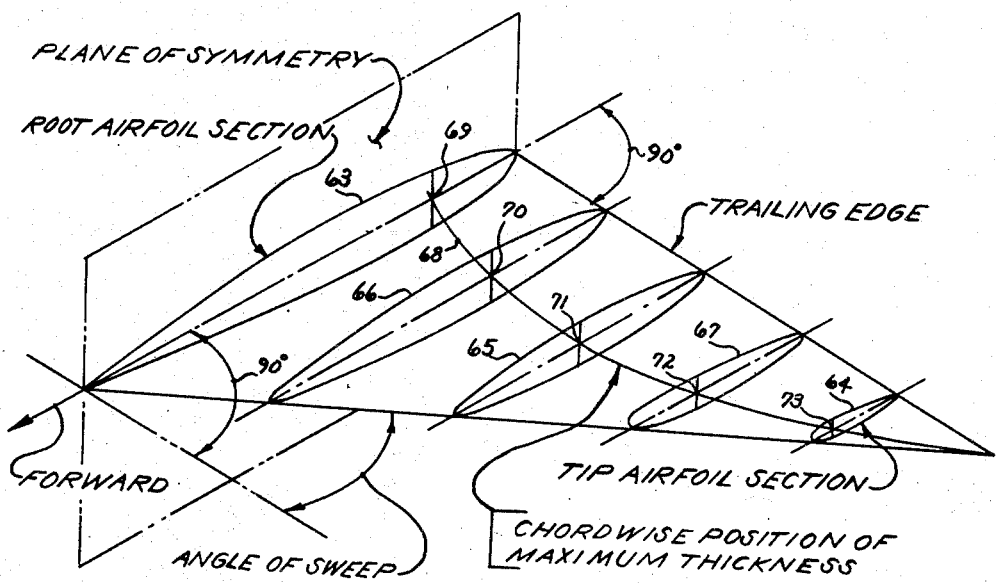

Fig. 4 is an isometric view of the left half of a delta type airplane wing wherein the leading edge is swept aft of and the trailing edge is parallel with the line drawn perpendicular to the root airfoil section chord line in the plane of symmetry; and Fig. 5 is an isometric view of the left half of an airplane wing tapered in planform with both leading and trailing edges swept forward of the line drawn perpendicular to the root airfoil section chord line in the plane of symmetry.

Figure 1:
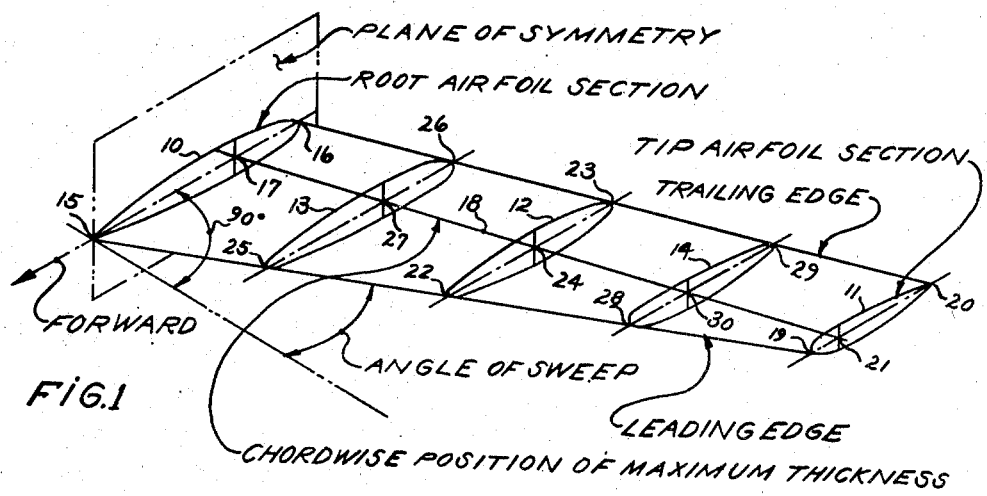
Fig. 1 is an isometric view of the left half of an airplane wing with parallel leading and trailing edges swept aft of a line drawn perpendicular to the root airfoil section chord line in the plane of symmetry.

Referring to the drawings I have shown in Fig. 1 the left half of a swept-back non-tapered airplane wing extending from the plane of symmetry. The plane of symmetry may be thought of as an imaginary plane midway between symmetrically constructed left and right wings of an airplane, and may be thought of further as the typical place of construction of the usual airplane fuselage. Fig. 1 diagrammatically illustrates the construction method of my invention by showing typical airfoil sections ranging from the wing root airfoil section 10 to the wing tip airfoil section 11, whereby and in conjunction with a typical mid-span wing airfoil section 12 and with the intermediate wing airfoil sections 13 and 14 the spanwise variations in the leading and trailing edge radii and in the chordwise positions of the wing maximum thickness are shown. The root airfoil section 10 has a sharp leading edge 15, a blunt trailing edge 16, and a chordwise position of maximum thickness 17, whereby the trailing edge 16 has a larger edge radius than the edge radius of the leading edge 15 and whereby the chordwise position of maximum thickness 17 is closest to the wing trailing edge than any other point along the line 18 representing the chordwise positions of the wing maximum thickness extending from the root airfoil section 10 to the tip airfoil section 11. The tip airfoil section 11 has a blunt leading edge 19, a sharp trailing edge 20, and a chordwise position of maximum thickness 21, whereby the leading edge 19 has a larger edge radius than the edge radius of the trailing edge 20 and whereby the chordwise position of maximum thickness 21 is closest to the wing leading edge than any other point along the line 18. The mid-span airfoil section 12 has a leading edge 22 and a trailing edge 23, each of equal edge radii, and a chordwise position of maximum thickness 24 midway between the leading and trailing edges 22 and 23 respectively, whereby the leading edge 22 has an edge radius of magnitude midway between those of the leading edges 15 and 19 respectively, whereby the trailing edge 23 has an edge radius of magnitude midway between those of the trailing edges 16 and 20 respectively, and whereby the chordwise position of maximum thickness 24 is on the line 18 midway between the leading and trailing edges 22 and 23 respectively. The intermediate airfoil section 13, being typical of one or more representative airfoil sections spaced spanwise between the root airfoil section 10 and the mid-span airfoil section 12, has a typical leading edge 25 with an edge radius in magnitude proportionately larger than that for the leading edge 15 and proportionately smaller than that for the leading edge 22, a typical trailing edge 26 with an edge radius in magnitude proportionately smaller than that for the trailing edge 16 and proportionately larger than that for the trailing edge 23, and a chordwise position of maximum thickness 27 lying on the line 18 connecting the chordwise positions of the maximum thickness of the representative airfoil sections from wing root to tip, whereby the trailing edge 26 has a larger edge radius than the edge radius of the leading edge 25 and whereby the chordwise position of maximum thickness 27 is closer to the wing trailing edge 26 than to the leading edge 25. The intermediate airfoil section 14, being typical of one or more representative airfoil sections spaced spanwise between the mid-span airfoil section 12 and the tip airfoil section 11, has a typical leading edge 28 with an edge radius in magnitude proportionately larger than that for the leading edge 22 and proportionately smaller than that for the leading edge 19, a typical trailing edge 29 with an edge radius in magnitude proportionately smaller than that for the trailing edge 23 and proportionately larger than that for the trailing edge 20, and a chordwise position of maximum thickness 30 lying on the said line 18, whereby the leading edge 28 has a larger edge radius than the edge radius of the trailing edge 29 and whereby the chordwise position of maximum thickness 30 is closer to the wing leading edge 28 than to the trailing edge 29.

Fig. 1, therefore, is an embodiment of my invention illustrating three fundamental properties of construction: one, a proportionate increasing of the leading edge radius from the sharp leading edge 15 of small radius to the blunt leading edge 19 of a much larger radius whereby the edge radii of the representative leading edges 25, 22 and 28, intermediate of the root and tip thereof, are proportionately increased respectively thereto and in a manner providing for smooth contours of the wing surface from root to tip; two, a proportionate decreasing of the trailing edge radius from the blunt trailing edge 16 of a larger radius to the sharp trailing edge 20 of a much smaller radius whereby the edge radii of the representative trailing edges 26, 23 and 29, intermediate of the root and tip thereof, are proportionately decreased respectively thereto and in a manner providing for smooth contours of the wing surface from root to tip; and three, a proportionate distribution from wing root to tip of the chordwise position of maximum thickness of the wing illustrated by the line 18 connecting the chordwise positions of the maximum thickness of the representative airfoil sections at the points 17, 27, 24, 30 and 21 whereby the point 17 at the root airfoil section 10 is closest to the wing trailing edge than any other point along the line 18, whereby the point 21 at the tip airfoil section 11 is closest to the wing leading edge than any other point along the line 18, and whereby the line 18 represents a proportionate movement forward from wing root to tip of the chordwise position of the wing maximum thickness in a manner providing for smooth contours of the wing surface from root to tip.

It is to be noted from my inventive method of construction of the non-tapered swept wing illustrated by the Fig. 1 that the line 18 represents a linearly distributed chordwise position of the wing maximum thickness from the wing root to tip.

Whereas Fig. 1 shows the detailed embodiment of my invention in the structure of a swept-back wing without planform taper, the Figures 2 through 5 following show the application of my invention in the structure of airplane wings embodying other planform shapes including the swept-forward.

Figure 2:
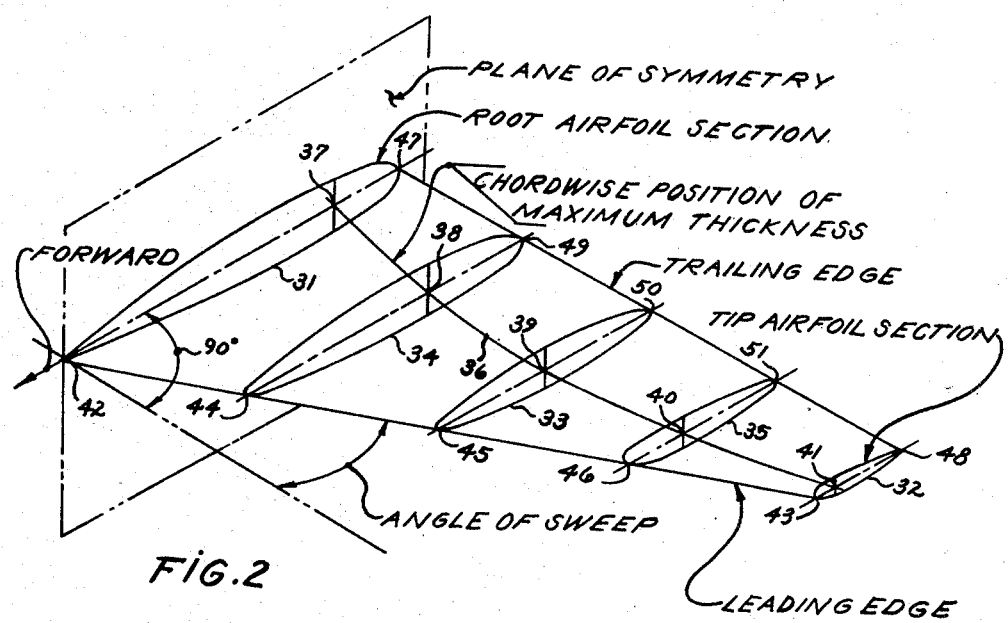
Fig. 2 is an isometric view of the left half of an airplane wing employing taper in planform from root to tip with both leading and trailing edges swept aft of a line drawn perpendicular to the root airfoil section chord line in the plane of symmetry.

Referring to the drawings I have shown in Fig. 2 the left half of a swept-back tapered airplane wing extending from the said plane of symmetry, whereby the root airfoil section 31, the tip airfoil section 32, the mid-span airfoil section 33, and the representative intermediate airfoil sections 34 and 35 bear the same leading and trailing edge characteristics as those of the corresponding airfoil sections 10, 11, 12, 13 and 14 respectively of Fig. 1. The characteristic difference between the construction of the wing of Fig. 2 and that of Fig. 1 lies in the spanwise distribution of the line 36, Fig. 2, connecting the chordwise positions of the maximum thickness of the representative airfoil sections at the points 37, 38, 39, 40 and 41 from wing root to tip, whereas the corresponding line 18 of Fig. 1 shows a linear distribution, the line 36 of Fig. 2 forms a curve illustrating the forward movement, in the spanwise progression, of the chordwise positions of the wing maximum thickness which is required in obtaining the correct and proportionate sharpness and bluntness of the leading and trailing edges of the airfoil sections from root to tip, thus fulfilling the fundamental properties of my invention.

Fig. 2, therefore, illustrates the embodiment of my invention in the structure of a tapered wing with swept-back leading and trailing edges and fulfills the three fundamental properties of my invention, namely: one, a proportionate increasing of the leading edge radius from the sharp leading edge 42 of small radius to the blunt leading edge 43 of a much larger radius whereby the edge radii of the representative leading edges 44, 45 and 46, intermediate of the root and tip thereof, are proportionately enlarged respectively thereto and in a manner providing for smooth contours of the wing surface from root to tip; two, a proportionate decreasing of the trailing edge radius from the blunt trailing edge 47 of a large radius to the sharp trailing edge 48 of a much smaller radius whereby the edge radii of the representative trailing edges 49, 50 and 51, intermediate of the root and tip thereof, are proportionately decreased respectively thereto and in a manner providing for smooth contours of the wing surface from root to tip; and three, a proportionate distribution from wing root to tip of the chordwise position of maximum thickness of the wing illustrated by the line 36 whereby the point 37 at the root airfoil section 31 is closest to the wing trailing edge than any other point along line 36, whereby the point 41 at the tip airfoil section 32 is closest to the wing leading edge than any other point along the line 36, whereby the point 39 at the mid-span airfoil section 33 is mid-way between the leading and trailing edges 45 and 50 respectively, and whereby the line 36 represents a proportionate movement forward from wing root to tip of the chordwise position of the wing maximum thickness in a manner providing for smooth contours of the wing surface from root to tip.

Figure 3:
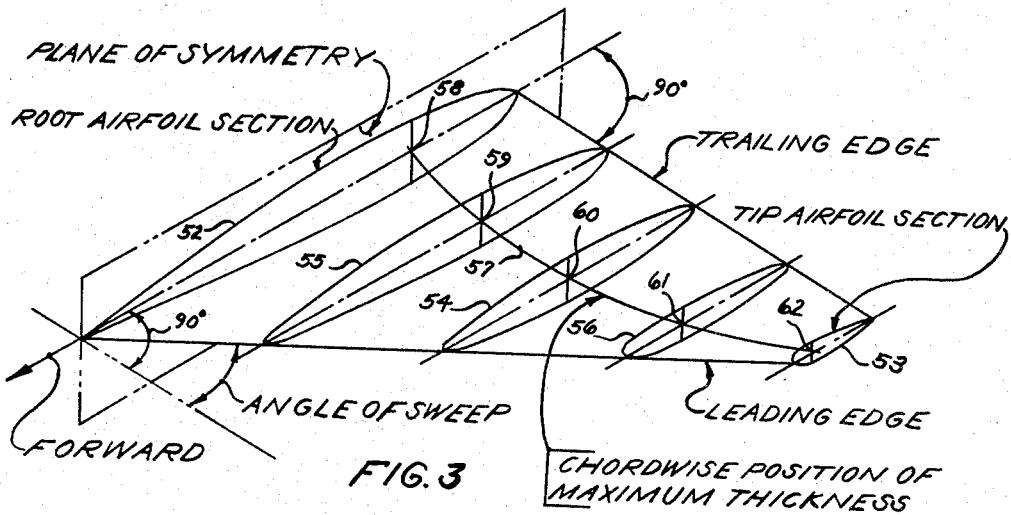
Fig. 3 is an isometric view of the left half of an airplane wing tapered in planform with the leading edge swept aft of and the trailing edge parallel with the line drawn perpendicular to the root airfoil section chord line in the plane of symmetry.

Referring to the drawings I have shown in Fig. 3 the left half of a tapered airplane wing, employing a swept-back leading edge and a trailing edge without sweep, extending from the said plane of symmetry, whereby the root airfoil section 52, the tip airfoil section 53, the mid-span airfoil section 54, and the representative intermediate airfoil sections 55 and 56 bear the same leading and trailing edge characteristic as those of the corresponding airfoil sections 31, 32, 33, 34, and 35 respectively of Fig. 2. The spanwise distribution of the line 57, connecting the chordwise positions of the maximum thickness of the representative airfoil sections at the points 58, 59, 60, 61 and 62 from wing root to tip, forms a curve, in much the same manner as the line 36 in Fig. 2, illustrating the forward movement, in the spanwise progression, of the chordwise positions of the wing maximum thickness which is required in obtaining the correct and proportionate sharpness and bluntness of the leading and trailing edges of the airfoil sections from root to tip, thus fulfilling the three fundamental properties of my invention so discussed with the Figures 1 and 2. The characteristic difference between the structure of the wings of Fig. 3 and Fig. 2 is that the line 57 of Fig. 3 has a curvature from root to tip determined by the amount of sweep only of the wing leading edge while the corresponding curvature of the line 36 of Fig. 2 is determined by the amount of the planiform taper employed.

Referring to the drawings I have shown in Fig. 4 the left half of a delta type airplane wing, extending from the said plane of symmetry whereby the root airfoil section 63, the tip airfoil section 64, the mid-span airfoil section 65, and the representative intermediate airfoil sections 66 and 67 bear the same leading and trailing edge characteristics as those of the corresponding airfoil sections 52, 53, 54, 55 and 56 respectively of Fig. 3. The spanwise distribution of the line 68, connecting the chordwise positions of the maximum thickness of the representative airfoil sections at the points 69, 71, 72 and 73 from wing root to tip, forms a curve, in much the same manner as the line 57 of Fig. 3, illustrating the forward movement, in the spanwise progression, of the chordwise positions of the wing maximum thickness which is required in obtaining the correct and proportionate sharpness and bluntness of the leading and trailing edges of the airfoil sections from root to tip, thus fulfilling the three fundamental properties of my invention so discussed with the Figures 1 and 2. Fig. 4 shows the embodiment of my invention in much the same manner as shown by Fig. 3 with the exception that Fig. 4 illustrates its application in the construction of a delta-type wing whereby the tip airfoil section 64 is shown as the practical construction tip when the planform taper is taken to the extreme of the sharp wing tip.

Referring to the drawings I have shown in Fig. 5 the left half of a swept-forward and tapered airplane wing, extending from the said plane of symmetry, which diagrammatically illustrates the construction method of my invention as applied to a wing swept forward of the line drawn perpendicular to the root airfoil section chord line in the plane of symmetry, whereby typical airfoil sections ranging from the wing root airfoil section 74 to the wing tip airfoil section 75, whereby and in conjunction with a typical mid-span wing airfoil section 76 and with the intermediate wing airfoil sections 77 and 78 the spanwise variations in the leading and trailing edge radii and in the chordwise positions of the wing maximum thickness are shown.

It is to be noted in the following description of Fig. 5 that the construction of a swept-forward wing embodying my invention is the reverse of that for a swept-back wing as described by the Figures 1 through 4 preceding.

Referring to Fig. 5, the root airfoil section 74 has a blunt leading edge 79, a sharp trailing edge 80, and a chordwise position of maximum thickness 81, whereby the leading edge 79 has a larger edge radius than the edge radius of the trailing edge 80 and whereby the chordwise position of maximum thickness 81 is closest to the wing leading edge than any other point along the line 82 representing the chordwise positions of the wing maximum thickness extending from the root airfoil section 74 to the tip airfoil section 75. The tip airfoil section 75 has a sharp leading edge 83, a blunt trailing edge 84, and a chordwise position of maximum thickness 85, whereby the trailing edge 84 has a larger edge radius than the edge radius of the leading edge 83 and whereby the chordwise position of maximum thickness 85 is closest to the wing trailing edge than any other point along the line 82. The mid-span airfoil section 76 has a leading edge 86 and a trailing edge 87, each of equal edge radii, and a chordwise position of maximum thickness 88 midway between the leading and trailing edges 86 and 87 respectively, whereby the leading edge 86 has an edge radius of magnitude midway between those of the leading edges 79 and 83 respectively, whereby the trailing edge 87 has an edge radius of magnitude midway between those of the trailing edges 80 and 84 respectively, and whereby the chordwise position of maximum thickness 88 is on the line 82 midway between the leading and trailing edges 86 and 87 respectively. The intermediate airfoil section 77, being typical of one or more representative airfoil sections spaced spanwise between the root airfoil section 74 and the mid-span airfoil section 76, has a typical leading edge 89 with an edge radius in magnitude proportionately smaller than that for the leading edge 79 and proportionately larger than that for the leading edge 86, a typical trailing edge 90 with an edge radius in magnitude proportionately larger than that for the trailing edge 80 and proportionately smaller than that for the trailing edge 87, and a chordwise position of maximum thickness 91 lying on the line 82 connecting the chordwise positions of the maximum thickness of the representative airfoil sections from wing root to tip, whereby the leading edge 89 has a larger edge radius than the edge radius of the trailing edge 90 and whereby the chordwise position of maximum thickness 91 is closer to the wing leading edge 89 than to the trailing edge 90. The intermediate airfoil section 78, being typical of one or more representative airfoil sections spaced spanwise between the mid-span airfoil section 76 and the tip airfoil section 75, has a typical leading edge 92 with an edge radius in magnitude proportionately smaller than that for the leading edge 86 and proportionately larger than that for the leading edge 83, a typical trailing edge 93 with an edge radius in magnitude proportionately larger than that for the trailing edge 87 and proportionately smaller than that for the trailing edge 84, and a chordwise position of maximum thickness 94 lying on the said line 82, whereby the trailing edge 93 has a larger edge radius than the edge radius of the leading edge 92 and whereby the chordwise position of maximum thickness 94 is closer to the wing trailing edge 93 than to the leading edge 92.

Fig. 5, therefore, is an embodiment of my invention illustrating the said three fundamental properties of construction previously described with the Figures 1 through 4 except that these said properties are now constructed in a reverse manner in Fig. 5 for adaptation of my invention to a wing which is swept forward.

The said three fundamental properties of my invention applied to a swept-forward wing are as follows: one, a proportionate decreasing of the leading edge radius from the blunt leading edge 79 of large radius to the sharp leading edge 83 of a much smaller radius whereby the edge radii of the representative leading edges 89, 86 and 92, intermediate of the root and tip thereof, are proportionately decreased respectively thereto and in a manner providing for smooth contours of the wing surface from root to tip; two, a proportionate increasing of the trailing edge radius from the sharp trailing edge 80 of small radius to the blunt trailing edge 84 of a much larger radius whereby the edge radii of the representative trailing edges 90, 87 and 93, intermediate of the root and tip thereof, are proportionately increased respectively thereto and in a manner providing for smooth contours of the wing surface from root to tip; and three, a proportionate distribution from wing root to tip of the chordwise position of maximum thickness of the wing illustrated by the curved line 82 connecting the chordwise positions of the maximum thickness of the representative airfoil sections at the points 81, 91, 88, 94 and 85 whereby the point 81 at the root airfoil section 74 is closest to the wing leading edge than any other point along the curved line 82, whereby the point 85 at the tip airfoil section 75 is closest to the wing trailing edge than ony other point along the curved line 82, and whereby the curved line 82 represents a proportionate movement rearward from wing root to tip of the chordwise position of the wing maximum thickness in a manner providing for smooth contours of the wing surface from root to tip.

It will be understood that other modifications may be made in the design and arrangement of the parts without departing from the spirit of the invention.

I claim:

1. A lifting surface or body, such as an airplane wing, adapted to be driven through fluids, such as air; said lifting body having a plan view form such that the leading and trailing edges of said plan view form are swept aft with respect to a vertical plane transverse to the plane of symmetry or longitudinal axis of the said lifting body; said lifting body having a structure within the said plan view form incorporating root, tip and one or more intermediate airfoil sections specifically shaped wherein the radii of curvature of the leading and trailing edges and the chordwise positions of the maximum thickness of said airfoil sections vary spanwise from root to tip in a progressive and proportionate manner forming smooth surface contours of and between the said airfoil sections; whereby the structure of the said root section consists of the following three features: one, a sharp leading edge formed by an edge radius smaller than the edge radius of the trailing edge of feature two following; two, a blunt trailing edge formed by an edge radius larger than the edge radius of the leading edge of feature one preceding; and three, a position of maximum thickness, defined in percent of the airfoil section chord, closest to the trailing edge; whereby the structure of the said tip section consists of the following three features: one, a blunt leading edge formed by an edge radius larger than the edge radius of the trailing edge of feature two following; two, a sharp trailing edge formed by an edge radius smaller than the edge radius of the leading edge of feature one preceding; and three, a position of maximum thickness, defined in percent of the airfoil section chord, closest to the leading edge; and whereby the structure of the said one or more intermediate airfoil sections between said root and tip sections have radii of curvature of their leading and trailing edges, and positions of maximum thickness, defined in percent of the airfoil section chord, progressively and proportionately altered in a manner whereby smooth surface fairing of and between the said airfoil sections at root and tip with the said intermediate sections thereof is provided.

2. A lifting surface or body, such as an airplane wing, adapted to be driven through fluids, such as air; said lifting body having a plan view form such that the leading and trailing edges of said plan view form are swept forward with respect to a vertical plane transverse to the plane of symmetry or longiutdinal axis of the said lifting body; said lifting body having a structure within the said plan view form incorporating root, tip and one or more intermediate airfoil sections specifically shaped wherein the radii of curvature of the leading and trailing edges and the chordwise positions of the maximum thickness of said airfoil sections vary spanwise from root to tip in a progressive and proportionate manner forming smooth surface contours of and between the said airfoil sections; whereby the structure of the said root section consists of the following three features: one, a blunt leading edge formed by an edge radius larger than the edge radius of the trailing edge of feature two following; two, a sharp trailing edge formed by an edge radius smaller than the edge radius of the leading edge of feature one preceding; and three, a position of maximum thickness, defined in percent of the airfoil section chord, closest to the leading edge; whereby the structure of the said tip section consists of the following three features: one, a sharp leading edge formed by an edge radius smaller than the edge radius of the trailing edge of feature two following; two, a blunt trailing edge formed by an edge radius larger than the edge radius of the leading edge of feature one preceding; and three, a position of maximum thickness, defined in percent of the airfoil section chord, closest to the trailing edge; and whereby the structure of the said one or more intermediate airfoil sections between said root and tip sections have radii of curvature of their leading and trailing edges, and positions of maximum thickness, defined in percent of the airfoil section chord, progressively and proportionately altered in a manner whereby smooth surface fairing of and between the said airfoil sections at root and tip with the said intermediate sections thereof is provided.

References Cited in the file of this patent

UNITED STATES PATENTS

| 1,786,307 | Kriegh | Dec. 23, 1930 |
| 1,792,015 | Herrick | Feb. 10, 1931 |

FOREIGN PATENTS

| 922,952 | France | Feb. 10, 1947 |